Dec. 19, 1939.   P. POTOCEK   2,183,692
COMBINED STRAINER AND COOLER
Filed Jan. 23, 1936
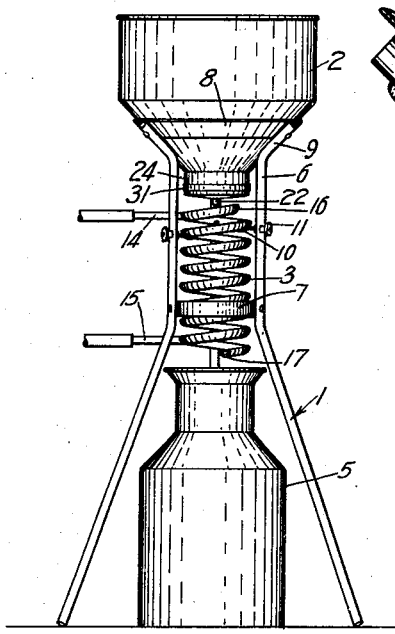
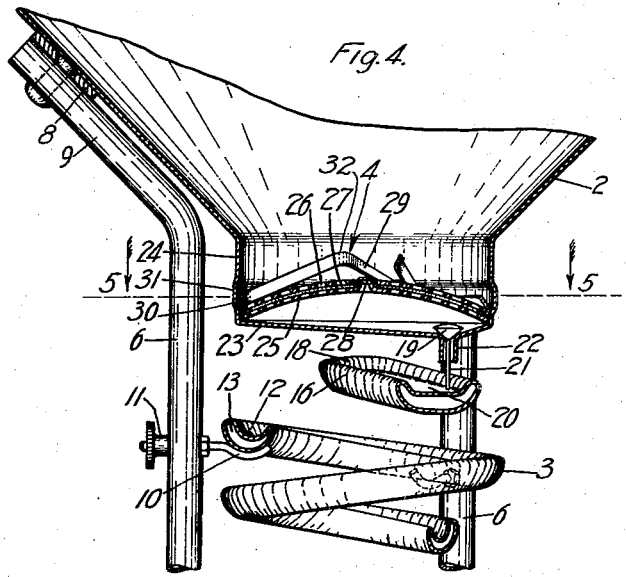
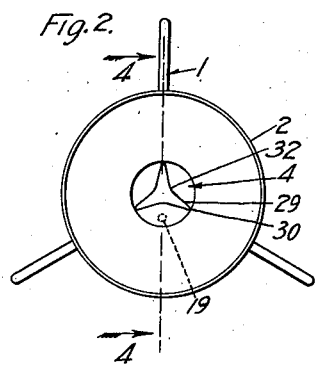
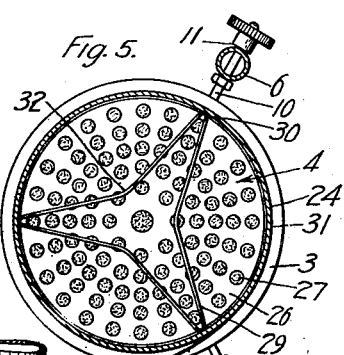
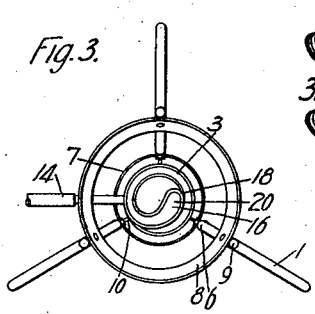
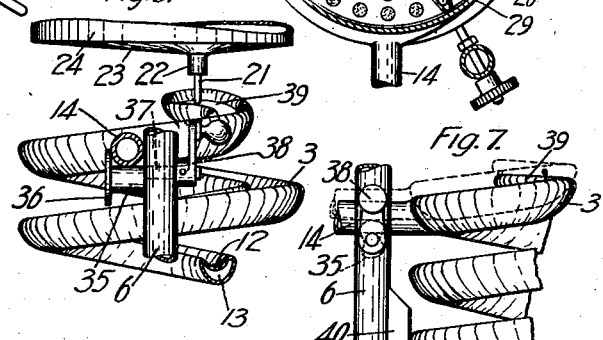
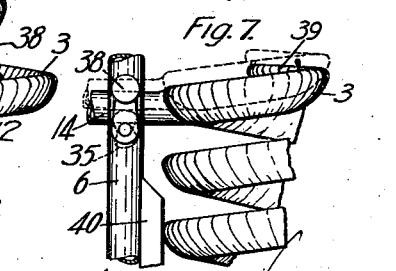
INVENTOR
Paul Potocek
By [signature]
ATTORNEY Patented Dec. 19, 1939

2,183,692

UNITED STATES PATENT OFFICE 2,183,692

COMBINED STRAINER AND COOLER

Paul Potocek, Hebron, Conn.

Application January 23, 1936, Serial No. 60,467

20 Claims. (Cl. 31—4)

My invention relates to combined strainers and coolers.

It has among its objects to provide an improved straining and cooling device especially adapted to use on small dairy farms wherein more extensive equipment is impractical. A further object of my invention is to provide such a device wherein the milk or other liquid is effectively strained and cooled, while utilizing a structure which is very convenient in use and adapted to be readily controlled. Further objects are to provide an improved structure adapted to be readily taken down for cleaning and one having parts of such character as to be readily and thoroughly cleaned. Other objects include the provision of improved straining and cooling means associated in an improved manner and having improved valve means controlling the flow therebetween. These and other objects and advantages of my improved construction will, however, hereinafter more fully appear.

In the accompanying drawing I have shown for purposes of illustration two embodiments which my invention may assume in practice.

In this drawing—

Fig. 1 is a side elevation of my improved structure embodied in a milk straining and cooling device;

Fig. 2 is a top plan view of the same with the strainer in position therein;

Fig. 3 is a top plan view with the hopper lifted off to facilitate illustration;

Fig. 4 is an enlarged detail view partially in section on line 4—4 of Fig. 2;

Fig. 5 is a sectional view on line 5—5 of Fig. 4;

Fig. 6 is a detail side elevation showing a modified form of the controlling mechanism, and Fig. 7 is a like detail view at right angles to Fig. 6 showing the cooling coil thereof in its different positions.

Referring first to the illustrative construction shown in Figs. 1 to 5, it will be noted that I have therein illustrated a support or tripod 1 carrying a hopper 2 and having a helical cooling coil 3 and strainer mechanism, generally indicated at 4, in the bottom of the hopper and above the cooling coil 3, while the latter is adjustable in an improved manner relative to a suitable receptacle or cam 5 disposed below the cooling coil and between the legs of the tripod 1, the various elements of the structure being improved as hereinafter more fully appears.

Referring first to the tripod 1, it will be noted that the same is provided with an upstanding body of reduced cross section and formed of spaced vertical portions 6 on the tripod members. As shown these portions 6 are suitably connected at their bottom as by a bottom ring 7 inside the same and suitably fixed thereto, and are also suitably connected at the top as by a hopper seat forming ring 8 connected to outwardly bent ends 9 on the portions 6 in which the hopper 2 is also rotatable. Thus, it will be noted that a light portable skeleton frame is provided adapted to receive the hopper 2 within the upper end thereof and the ring 8, and also adapted to receive the cooling coil 3 in the intermediate body between the portions 6 and below the hopper 2, while disposing the lower end of the cooling coil 3 above the top of the can 5 which is readily insertable and removable between the legs of the tripod.

As regards the cooling coil 3, it will be noted that the same is supported by supporting members 10 in the form of arcuate supports underlying and conforming to the coil and suitably attached, as at 11, at their outer ends near the tops of the intermediate portions 6 of the frame forming the body described. Herein, three such members 10 are provided adapted to support the cooling coil in operative position, and also adapted to permit that coil to be rotated on the members 10 in such manner as to raise or lower the coil. Attention is further directed to the fact that the coil 3 is provided with an arcuate groove 12 in the top thereof and throughout the length thereof which forms a milk channel while effectively confining the milk to this channel in the downward flow of the milk from the hopper 2 into the can 5. Herein, it will further be observed that within the coil 3, a cooling water passage 13 is provided under the bottom of the channel 12, so that, when water is circulated through this passage 13, the downwardly flowing milk is effectively cooled before it reaches the can 5. Also, it will be noted that laterally extending cooling water connections 14 and 15 lead off from the coil at points adjacent its opposite ends and are rigidly connected to the coil so that the desired flow of cooling water may be maintained therethrough, the connections 14 and 15 communicating with the water passage 13. Herein, the latter also is provided with a closed upper end portion 16 projecting toward the bottom of the hopper 2 and a like closed lower end portion 17. Obviously, however, both of these end portions may, if desired, be provided with suitable removable closures, not shown, adapted to permit cleaning of the water passage when desired.

Cooperating with the above described rotatably mounted coil 3 is improved valve mechanism controlling the flow from the hopper 2. Herein, the upper end portion 16 of the coil is enlarged and enclosed in a wall 18 to provide an enlarged milk receiving portion disposed beneath a valve 19 in the bottom portion of the hopper 2. Herein also, the enlarged portion 16 is provided with an inclined bottom 20 adapted either to engage and lift or to permit the lowering of the bottom end of a depending stem 21 of the valve 19 as the coil 3 is rotated slightly in opposite directions on its supports 10. More particularly, when the coil 3 is rotated in one direction, the inclined surface 20 acts to raise the stem 21 in such manner as to raise the conical head of the valve and thus open the same and permit the desired flow through a tubular outlet 22 disposed at the lowest point in the bottom 23 of the hopper. When the coil is reversely rotated, the inclined surface 20 is moved out from under the stem of the valve in such manner as to permit the valve 19 to be lowered by gravity and thus cut off the flow through the outlet 22 or reduce the flow as desired. Obviously, a like control of the valve may be effected by reverse rotative movements of the hopper 2 in the ring 8. In order that the control of the valve may be effected either by rotation of the coil 3 or hopper 2, it will be understood that the inclination of the surface 20 engaging the valve stem 21 preferably will be slightly less than the inclination of the helical convolutions of the coil.

Herein, it will be observed that the bottom 23 of the hopper 2 is carried on a reduced portion 24 of the hopper and that the strainer means 4 is disposed in this portion 24 above the valve 19. Referring more particularly to the strainer means, it will also be noted that the same, herein, comprises a raised, shallow, yet generally conical bottom perforated strainer plate 25 adapted to engage the edge of the portion 24 just above the bottom 23, and also a cooperating perforated strainer plate 26 adapted to be received on the plate 25 and clamp suitable strainer material, as for example, a cloth 27, between the plates. Further, it will be noted that, herein, an axial projection 28 is provided on the strainer plate 25 and adapted to be received in a corresponding recess in the plate 26 in such manner as to permit the same to form a unit when the cloth 27 is therebetween, while also permitting ready separation of the parts of the unit for cleaning or the substitution of another cloth. Attention is further directed to the fact that a spring retaining member, generally indicated at 29, is provided to hold the strainer unit in place. As shown, this member 29 has a plurality of ends 30, herein three, adapted to engage with and snap over one wall of a slightly enlarged portion 31 on the portion 24 of the hopper, in such manner as to hold the above strainer unit securely in operative position. Herein, the spring retaining member is also, as preferably, in one piece and generally star shaped and provided with double resilient connecting portions 32 adapted to be compressed at the center to effect release of the ends 30 from the wall of the portion 31, and further adapted, when the portions 32 are released, to cause the same to expand and thereby cause the ends 30 to engage the wall 31, and thus, hold the strainer unit securely in position.

In the use of my improved construction, it will be understood that, with water circulating through the water passage 13 in the coil 3 from an inlet 15 and then passing out through an outlet 14, the coil 3 or hopper 2 may be slightly rotated in either direction to open or close the valve 19 as needed. As a result, the milk can be caused to flow as fast as desired, from the hopper 2 through the strainer 4 and down through a valved control passage 22 onto the surface 20 on the coil and thence along the milk groove 12 into the can 5, while being effectively cooled due to the flow of cooling water through the water passage 13. For example, with the valve 19 left in open position the milkers may merely pour the contents of their buckets into the hopper 2, and the milk will be automatically supplied from the hopper 2 to the can 5 and automatically properly cooled in its passage from one to the other. When, however, a can 5 is filled, it is only necessary to rotate the hopper 2 or coil 3 slightly as by grasping the underside of the latter at a convenient point, in order thereby to move the inclined portion 20 out from supporting relation to the valve stem 21 and thereby permit the valve 19 to be seated by gravity and, thus, cut off further flow from the hopper 2. When a new can is placed in position, a reverse rotation of the coil will obviously open the valve 19 to permit further milk flow and automatic straining and cooling of the milk flowing to the can.

As a result of my improved construction, it is possible to provide an inexpensive structure adapted to the needs of a small dairy farm. Thus, depending upon the setting of the valve 19, the milk from two or more milkers may be automatically strained and cooled without requiring waiting or delays, and while permitting the flow of milk to the can to be readily started or stopped whenever desired. Further, it will be apparent that all of the parts of the structure in contact with the milk may be readily removed for cleansing, the hopper and strainer parts being readily removable upwardly as well as the valve, and the coil 3 also being readily separable downwardly when the supports 10 are removed. Thereupon, the whole coil may be withdrawn downwardly through the bottom of the body and below said members 6. Attention is further directed to the fact that the structure is such as to be readily cleaned, all surfaces in contact with the milk being such as to be readily cleaned and conveniently accessible for cleaning, including all surfaces on the hopper 2 and the milk flow passages or grooves on the exterior of the coil 3, while the separable character of the strainer and the shape of the spring holding member 29 therefor is such as also to facilitate ready and thorough cleansing thereof. It will further be observed that, through the use of metal of the desired thermal qualities as, for example, copper for the coil 3, effective heat transfer is provided through the wall of the coil separating the flowing milk and cooling water. These and other advantages of my improved construction will, however, be clearly apparent to those skilled in the art.

In Figs. 6 and 7, I have also illustrated a modified construction which may be used if desired. In this construction, while utilizing a valve similar to that heretofore described and having a like depending stem 21, it will be noted that the coil 3 is not rotated as heretofore to vary the opening and closing of the valve, but instead is raised and lowered. This raising and lowering movement is also effected through improved mechanism, herein acting on the upper water inlet 14, which, in this construction, also acts as a support for the coil. More particularly, it will be noted that the portion 14 extends laterally over a cam 35 and between a collar 36 on this cam and one of the uprights of the portion 6 of the tripod. Further, it will be noted that this cam 35 is suitably journaled, as at 37, in the upright, and that a handle 38 is provided on the other end of the journal. Thus, with the handle 38 and cam 35 in one position, the surface 39 at the upper end of the milk groove or passage 12 is caused to engage with the stem 21 of the valve, and, raising the latter, start the milk flow. When, however, the handle 38 and cam 35 are moved into their opposite positions, the coil 3 is lowered out of contact with the stem in such manner as to permit the latter to close and interrupt the milk flow. Here, the journal 37 also has sufficient friction to permit the handle and cam to be held in their different positions and thus eliminate the need for special holding means, although such means may be provided if desired. Also, it will be observed that in this construction, I may provide one or more guides 40 for the coil which act to hold the same against tilting in any position thereof. Here also, of course, it will be evident that the coil may be readily removed when desired as, for example, by raising the same and rotating it slightly to disengage from the cam, whereupon the whole coil may be lowered bodily in such manner as to permit it to be readily removed for cleansing.

While I have in this application specifically described two forms which my invention may assume in practice, it will be understood that these forms are chosen for purposes of illustration and that the structure may be modified and embodied in other forms without departing from its spirit or the scope of the appended claims.

What I claim as new and desire to secure by Letters Patent is:

1. In a liquid cooling device, a rigid supporting frame restable on a floor and presenting a substantially free interior open at its lower portion to admit a receptacle therein, a hopper superposed on said frame and having a discharge passage, a helical cooling and delivering coil terminating at one end in an open receiving portion underlying said hopper passage, and arms reaching in from said frame on which said coil is freely rotatable to vary the height of the coil, said arms being removable to permit removal of said coil through the receptacle receiving portion of said frame.

2. In a liquid cooling device, a frame, a cylindrical hopper superposed on said frame, and a helical cooling and delivering coil supported on said frame in axial alignment with said hopper and having an open liquid receiving portion eccentric of the axis of said coil, said hopper having a discharge passage eccentrically thereof in registry with said receiving portion.

3. In a liquid cooling device, a frame, a hopper thereon, a cooling unit beneath said hopper, a valve controlling the flow from said hopper to said cooling unit, and means operative upon relative movement between said hopper and cooling unit to control said valve.

4. In a liquid cooling device, a frame, a hopper thereon, a cooling unit beneath said hopper, a valve controlling the flow from said hopper to said cooling unit, said hopper and unit being relatively rotatable, and means operable upon relative rotation of one of the same for controlling said valve.

5. In a liquid straining device, a frame, a strainer thereon, a cooling unit beneath said strainer, a valve between said strainer and unit controlling the flow of strained liquid to said unit, said strainer and unit being relatively rotatable, and means automatically operative to control said valve upon such relative rotation.

6. In a liquid straining and cooling device, a frame, a hopper thereon, a cooling unit adjustably mounted in said frame beneath said hopper and having separate passages for the cooling and cooled liquids, a strainer in said hopper, a valve between said strainer and unit controlling the flow of strained liquid to the passage therefor, and means automatically operative to control said valve upon adjustment of said unit in said frame.

7. In a liquid straining and cooling device, a frame, a hopper thereon, a cooling unit rotatably mounted in said frame beneath said hopper and having separate passages for the cooling and cooled liquids, a strainer in said hopper, a valve between said strainer and unit controlling the flow of strained liquid to the passage therefor, and means automatically operative to control said valve upon rotation of said unit in said frame.

8. In a liquid straining and cooling device, a frame, a hopper thereon, a cooling unit adjustably mounted in said frame beneath said hopper and having separate passages for the cooling and cooled liquids, a strainer in said hopper, a valve between said strainer and unit controlling the flow of strained liquid to the passage therefor and having a depending stem, and means automatically operative to control said valve upon adjustment of said unit in said frame including a portion engageable with said valve stem.

9. In a liquid straining and cooling device, a frame, a hopper thereon, a cooling unit rotatably mounted in said frame beneath said hopper and having separate passages for the cooling and cooled liquids, a strainer in said hopper, a valve between said strainer and unit controlling the flow of strainer liquid to the passage therefor, and means automatically operative to control said valve upon rotation of said unit in said frame, said valve having a depending stem and said unit carrying cam means engageable therewith and rotatable with said unit.

10. In a liquid straining and cooling device, a frame, a hopper thereon, a cooling coil in said frame beneath said hopper and having separate passages for the cooling and cooled liquids, a strainer in said hopper, a valve in said hopper between said strainer and coil controlling the flow of strained liquid to the passage therefor; said hopper, strainer and valve being bodily removable from said frame and individually longitudinally separable, and said coil likewise being longitudinally separable from said frame.

11. In a liquid straining and cooling device, a frame, a hopper thereon carrying a strainer, a helical cooling and delivering coil beneath said hopper having separate passages for the cooling and cooled liquids, and means on said frame engaging and supporting said coil located out of the path of movement of said cooled liquid comprising projecting means on said frame engaging the under side of certain of the convolutions of said coil.

12. In a liquid straining and cooling device, a frame, a hopper thereon carrying a strainer, a helical cooling and delivering coil beneath said hopper having separate passages for the cooling and cooled liquids, and means on said frame engaging and supporting said coil located out of the path of movement of said cooled liquid comprising projecting means on said frame engaging the under side of certain of the convolutions of said coil, said coil and supporting means having means for enabling rotation of said coil while supported on the latter.

13. In a liquid straining and cooling device, a frame, a hopper thereon carrying a strainer, a helical cooling and delivering coil beneath said hopper having separate passages for the cooling and cooled liquids, and means on said frame engaging and supporting said coil located out of the path of movement of said cooled liquid including projecting means on said frame engaging the under side of said coil comprising a plurality of laterally adjustable coil supporting members.

14. In a liquid straining and cooling device, a frame, a hopper thereon carrying a strainer, a helical cooling and delivering coil beneath said hopper having separate passages for the cooling and cooled liquids, and means on said frame engaging and supporting said coil, said coil having a lateral pipe connection at its upper end and said supporting means on said frame comprising cam means engaging and supporting said pipe connection and adjustable to vary the elevation of said coil.

15. In a liquid cooling device, a hopper having a fluid outlet, and a cooling unit comprising a helical cooling coil having an internal cooling liquid passage therethrough and an external open passage for liquid to be cooled overlying said liquid passage substantially throughout its length, and also having an enlarged liquid receiving portion on its upper end communicating with said passage for the liquid to be cooled and receiving liquid from said outlet.

16. In a liquid cooling device, a hopper having a fluid outlet, a valve controlling the latter, a cooling unit comprising a helical cooling coil having an internal cooling liquid passage therethrough and an external open passage for liquid to be cooled overlying said liquid passage substantially throughout its length, and also having an enlarged liquid receiving portion on its upper end communicating with said passage for the liquid to be cooled and receiving liquid from said outlet, and a sloping cam surface on said enlarged portion controlling said valve.

17. In a liquid cooling and straining device, a hopper having a reduced lower end, a valve reciprocable in the bottom of said hopper and having a stem projecting below said bottom, strainer means in said reduced end spaced above said valve, a cooling coil adjustable beneath said valve having means receiving the flow through said valve, and means on said coil adjustable to vary the position of said valve upon adjustment of said coil.

18. In a liquid cooling and straining device, a hopper having a reduced lower end, a valve reciprocable in the bottom of said hopper and having a stem projecting below said bottom, strainer means in said reduced end spaced above said valve, a cooling coil adjustable beneath said valve having means receiving the flow through said valve, means on said coil adjustable to vary the position of said valve upon adjustment of said coil, and a support for said hopper and coil having means for enabling adjustment of said coil toward and from said hopper to control said valve.

19. In a liquid cooling and straining device, a hopper having a reduced lower end, a valve reciprocable in the bottom of said hopper and having a stem projecting below said bottom, strainer means in said reduced end spaced above said valve, a cooling coil adjustable beneath said valve having means receiving the flow through said valve, means on said coil adjustable to vary the position of said valve upon adjustment of said coil, and a support for said hopper and coil having means for enabling adjustment of said coil toward and from said hopper to control said valve comprising a plurality of radially located coil supporting members on which said coil is rotatable into different vertical positions.

20. In a liquid cooling and straining device, a hopper having a reduced lower end, a valve reciprocable in the bottom of said hopper and having a stem projecting below said bottom, strainer means in said reduced end spaced above said valve, a cooling coil adjustable beneath said valve having means receiving the flow through said valve, means on said coil adjustable to vary the position of said valve upon adjustment of said coil, and a support for said hopper and coil having means for enabling adjustment of said coil toward and from said hopper to control said valve comprising a cam carried on said support and a part of said coil cooperating with said cam and operative upon rotation of said cam to vary the elevation of said coil.

PAUL POTOCEK.